United States Patent Office 3,215,265
Patented Nov. 2, 1965

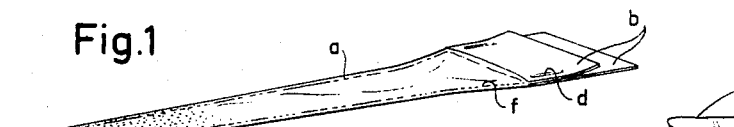
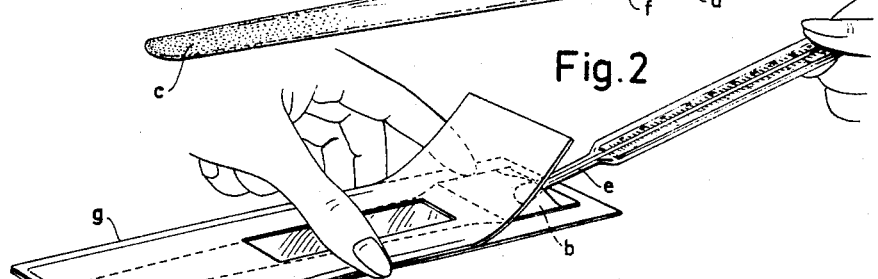
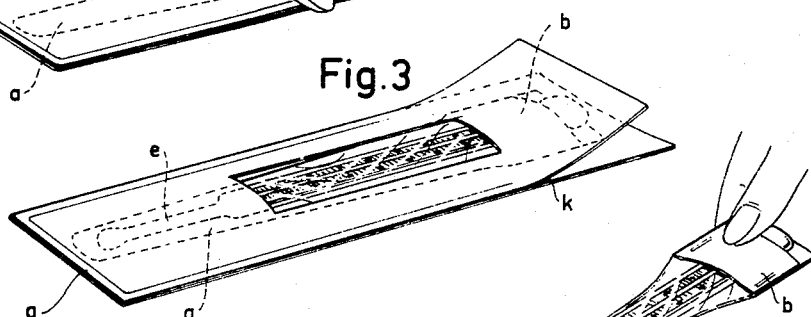
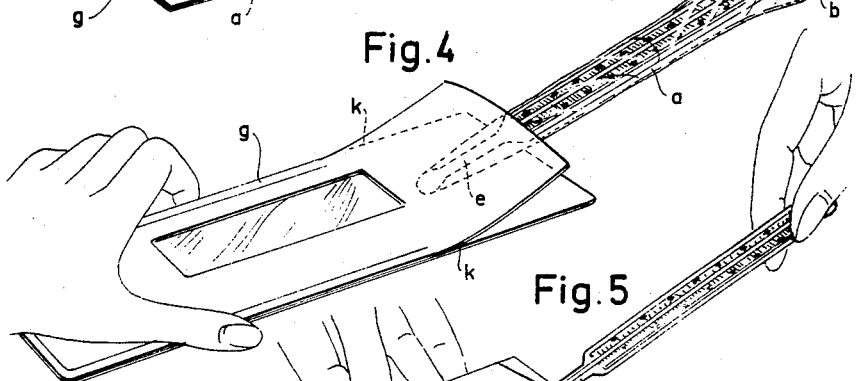
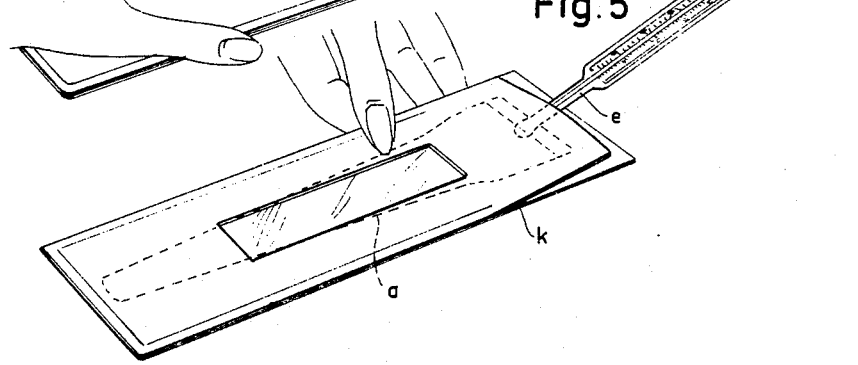

3,215,265
MEANS AND METHOD FOR PREVENTING THE SPREADING OF INFECTIOUS DISEASES WHEN TAKING THE TEMPERATURE OF PATIENTS
John Henrik Guy Welin-Berger, Lustigkullagatan 3, Vasteras, Sweden
Filed Dec. 2, 1963, Ser. No. 327,403
Claims priority, application Sweden, Dec. 7, 1962, 13,207/62
6 Claims. (Cl. 206—63.2)

The instant invention relates to means and a method for preventing the spreading of infectious diseases when taking the temperature of patients, especially in hospitals.

The clinical glass thermometers commonly used have an end portion containing a temperature sensitive fluid, which when heated expands more than the surrounding glass, and these thermometers constitute an indispensable part of the clinical equipment and seems to maintain their position as a valuable diagnostic means. The use of clinical thermometers, however, involves, as is well known, great risks for the spreading of diseases on account of the fact that it is impossible to sterilize them through boiling. They are instead usually cleaned through wiping and then treated with and kept in disinfectants, which does not always guarantee a satisfactory protection. Besides the risk of infection such disinfecting methods involve a great deal of work for the personnel of hospitals and considerable expense for disinfecting fluids.

It has therefore been proposed to insert the thermometer in a thin bag-like sheath of some transparent material, for instance plastic, in order to protect the patient against infections and in order to prevent the thermometer itself from being infected when inserted into the body of the patient during the measuring of the temperature. In order to remove the sheath from the thermometer, after the temperature has been measured, without touching it, a device has been proposed in which a piece of thread is fastened to the inner side of the closed end of the sheath, the thread extending longitudinally through the sheath and out of the open end thereof. It is obvious, however, that a device of this kind involves great risk of spreading of infections. The protruding thread part may either be contaminated during the taking of temperature and further the person measuring the temperature, for instance the nurse, may accidentally touch the sheath when pulling it over itself from its open end and thus become contagious.

The present invention originates from the understanding that if such a device for the preventing of spreading of infections when temperature is taken shall function satisfactorily, it must be certain that the thermometer itself is not infected, further the patient must be protected against infections, and finally it must allow the reading of the temperature as well as the handling of the thermometer after the temperature has been taken without risk to the persons concerned, for instance a nurse or her assistant, coming into contact with contaminated surfaces.

In order to solve the above mentioned problems according to the present invention a composite safety device is proposed which consists of two protecting covers for the thermometer; one inner suitably transparent sheath, for instance of plastic, in which the thermometer is inserted when preparing for the taking of a patient's temperature and which is intended to be inserted into the body of the patient together with the thermometer, and an outer cover which envelops the inner sheath and which is suitably also wholly or partly transparent and having for instance the shape of an envelope, out of which the inner protecting sheath with the thermometer therein is removed for the taking of temperature and into which it is again inserted when this procedure is accomplished.

According to the present invention it is possible to produce the protective devices as complete, flat packets, which may be kept in sterilized condition until they are to be used. It is only necessary to insert a clean thermomenter into the inner sheath which is still kept in the outer cover and to distribute the required number of thermometers thus protected among the patients. The thermometer and the inner sheath may be kept protected in this manner until the temperature of the patients is to be measured. All one has to do is to pull the thermometer together with the inner sheath out of the outer cover and to insert them into the body of the patient. After the temperature has been taken the thermometer together with the inner sheath is again introduced into the outer cover. In this manner the patient himself is able to perform the taking of his own temperature. For reading the temperature all the nurse has to do is either to pull the thermometer out of the protecting device as much as is necessary to read the scale or, if both protecting covers are transparent, to read the temperature without pulling out the thermometer. In doing so the nurse obviously will not come in contact with the portions of the protecting device or the thermometer, which may be contaminated.

When washing the thermometer the protecting device is removed and the thermometer is rinsed in cool water and put into some suitable disinfecting fluid.

In order to facilitate the inserting of the thermometer into the inner sheath and its removing from said sheath the open end of the sheath is made of some rather stiff material. This sheath is suitably composed of two separate parts, one of which forms the closed portion of the sheath and is fastened to the inner surface of the other one forming the open end portion of the sheath. The open end thus forms an inserting cuff which is suitably slotted at two opposite sides thus providing two flaps which may be forced apart when the thermometer is to be inserted. In order further to facilitate this procedure one of these flaps may be slightly longer than the other one.

According to a modification of the invention the closed portion of the inner sheath at its outer surface facing the inner side of the outer cover is provided with a thin layer of grease facilitating the insertion of the thermometer together with the inner sheath into the body of the patient. The closed portion of the inner sheath may also at its inner surface be covered with a thin layer of grease, which facilitates the insertion of the thermometer into said sheath. The grease may suitably contain a disinfectant.

In case the patient himself is not allowed to check his temperature the open end portion of the inner sheath may consist of a non-transparent material and may be arranged so that at least a part of the scale is covered.

The outer protecting cover is, according to another embodiment of the invention, a protecting envelope, the inner surface of which is provided with a dense coating which prevents the grease or Vaseline at the outer surface of the inner sheath from sticking to the inner surface of the outer cover or evaporating. The outer protecting cover or envelope may, in the same manner as the inner sheath, be suitably provided with two slots forming two flaps which may be put apart when the thermometer is to be inserted into the inner protecting sheath, or when the thermometer together with the inner protecting sheath is to be introduced in the outer protecting cover after a taking of temeprature has been accomplished. It is suitable to cut the flaps of the outer protecting cover to different lengths so that they may easily be put apart.

The invention also relates to a method of taking the temperature by utilizing a protecting device consisting of an inner protecting sheath of a suitably transparent material, for instance plastic, and an outer protecting cover enveloping the inner sheath and also wholly or partly consisting of a transparent material, a clean thermometer being at first inserted into the inner protecting sheath which is preferably covered with a layer of grease and is then within the outer protecting cover, whereupon a patient's temperature is taken by first removing the thermometer together with the inner sheath from the outer cover and then introducing them into the body of the patient, the thermometer together with the inner sheath then again inserted into the outer cover after the taking of temperature, whereupon the reading of the temperature takes place without touching contaminated parts of the protecting device or the thermometer, either by pulling the thermometer out of the inner sheath placed in the outer cover as much as is necessary to enable reading of the scale, or if the inner sheath as well as the outer cover are transparent, wholly or in part by reading the thereomometer directly without removing the same, and after a single use the inner sheath and the outer cover are both removed at the same time from the thermometer and destroyed.

The invention will now be described more in detail with reference to the attached drawing, in which similar elements are designated by the same letters and which shows the following:

FIGURE 1 is a perspective view of the inner protecting sheath,

FIGURE 2 is a perspective view of the outer protecting cover and the inner protecting sheath as well as the end of the thermometer being introduced between the flaps of the inner protecting sheath, FIGURE 3 is a perspective view of the outer protecting cover and the inner protecting sheath together with the thermometer being introduced into the same, FIGURE 4 is an illustration of the outer protecting cover and the inner protecting sheath partly pulled out of the outer cover, said sheath containing the thermometer and FIGURE 5 is an illustration of the outer protecting cover containing the inner protecting sheath during their removal from the thermometer after the taking of temperature has been accomplished.

The inner protecting sheath shown in FIG. 1 has a closed softer portion $a$ and an open stiffer portion $b$. The closed portion has a shape similar to that of the thermometer and consists of two strips of plastic which are united by a welding seam $f$. The open portion is for instance made of paper of suitable stiffness and consists of a smaller top piece and a somewhat wider bottom piece, said pieces forming two flaps, one of which extends beyond the other, said flaps being united by seams or the like $d$. Owing to the fact that the cuff thus formed has one flap extending further than the other one, the insertion of the thermometer is made easier.

The closed softer portion $a$ of the inner protecting sheath is at its inner and outer surfaces coated with a thin layer of grease $c$.

In order to protect the inner sheath against contamination or infection before it is to be used for taking of temperature and in order to protect the surrounding from being infected from said inner sheath after taking of temperature, the inner sheath $a$, $b$ is preferably inserted into the outer cover $g$ already during the manufacturing in order to obtain a protecting device of the kind shown in FIGURE 2. This figure shows how the end portion $e$ of the thermometer is about to be inserted into the inner sheath, $a$, $b$ of a protecting device consisting of an outer cover $g$ and an inner sheath $a$, $b$.

FIGURE 3 shows the protecting device, $a$, $b$, $g$ with a thermometer inserted therein being in condition to be distributed to the patients. In the modification shown the transparent portion of the outer cover $g$ has the form of a window, through which a part of the inner sheath $a$ and the scale of the thermometer may be seen.

When taking a patient's temperature the inner protecting sheath $a$, $b$ containing the thermometer is pulled out by taking hold of the stiffer portion $b$ of the inner sheath and the thermometer with the right hand and by using the left hand to fold the outer cover $g$. The thermometer protected by the inner sheath is then introduced into the body of the patient. When the temperature has been taken the inner protecting sheath $a$, $b$ together with the thermometer is inserted in the same way into the outer protecting cover $g$. Evidently the outer surface of the outer protecting cover will not come in touch with the contaminated inner protecting sheath.

FIGURE 5 shows how the protecting device, that is the outer protecting cover $g$ as well as the inner protecting sheath $a$, $b$ is removed from the thermometer in order to be destroyed. Thereafter it is only necessary to rinse the thermometer in chilly water, shake the mercury or fluid down and to put the thermometer into a suitable disinfecting fluid.

As shown in FIGURES 2, 3, 4 and 5 the slots $k$ of the outer protecting cover facilitate the insertion of the thermometer into the inner sheath as well as the insertion of the inner sheath $a$, $b$ together with the thermometer into the outer protecting cover $g$.

Although the invention has been described in connection with an embodiment of the same it is obvious that other modifications may be made without departing from the scope of the following claims.

What I claim is:

1. A protecting device for preventing the spread of infectious diseases when taking the temperature of patients by means of a fever thermometer, for example a fever thermometer of the type made of glass containing a temperature sensitive fluid which when heated expands more than the surrounding glass, characterized in that the protecting device consists of two protecting covers for the thermometer, one cover being an inner protecting sheath having a closed end and an open end into which the thermometer is inserted when preparing to take a patient's temperature and which sheath together with the thermometer is intended to be inserted into the body of the patient, the inner sheath being constructed at least partially of plastic transparent material for reading the thermometer therethrough, and the other of the two protecting covers being an outer cover which also has a closed end and an open end and is sufficient size to envelop the inner sheath so that the inner sheath may be removed together with the thermometer from the open end of the outer cover for taking a patient's temperature and then inserted again into the outer cover after the temperature is taken, the outer cover being constructed at least partially of plastic transparent material for reading the thermometer through the outer cover and transparent inner sheath, the open end of the inner sheath being formed from stiffer material than the closed end which is formed from transparent plastic material, the stiffer material thereby forming a cuff for the insertion of the thermometer, the cuff including two flaps, one longer than the other, which may be forced apart when the thermometer is to be inserted into the inner sheath, the outer cover being a protecting envelope with its open end including a pair of flaps of relatively stiff material, the flaps defined by opposite slots in the side of the envelope adjacent the open end, one of the flaps being longer than the other so that the flaps may be opened when the thermometer together with the inner sheath is inserted into the outer cover after a patient's temperature is taken.

2. A device as defined in claim 1 wherein the closed end of the inner sheath consists of two plastic strips positioned one upon the other and united by a welded seam around the edges thereof.

3. A device as defined in claim 1 wherein the closed end of the inner protecting sheath is covered with a thin layer of grease at least on its outer surface.

4. A protecting device as defined in claim 3 wherein the grease contains a disinfectant.

5. A device as defined in claim 1 wherein the inner surface of the outer cover is provided with a dense coating which prevents the grease at the outer surface of the inner sheath from sticking to the inner surface of the outer cover and prevents the grease from evaporating.

6. A method for preventing the spread of infectious diseases when taking the temperature of patients by the use of a thermometer protected by a partially transparent inner sheath and a partially transparent outer cover, the method comprising, first inserting a clean thermometer into the inner protecting sheath while said sheath is within the outer protecting cover, removing the thermometer together with the inner sheath from the outer cover and introducing it into the body of a patient for the taking of the patient's temperature, after taking the temperature inserting the thermometer and the inner sheath surrounding the same into the outer cover, reading the temperature of the thermometer through the transparent portions of the inner sheath and outer covering without touching the inner sheath and thermometer therein, and finally removing both the inner and outer sheath from the thermometer and destroying the same after a single use.

References Cited by the Examiner
UNITED STATES PATENTS

| | | | |
|---|---|---|---|
| 1,240,880 | 9/17 | Rink | 206—16 |
| 1,816,425 | 7/31 | Everett et al. | 206—16.6 |
| 2,365,556 | 12/44 | Karg | 206—63.2 |
| 2,677,965 | 5/54 | Saffir | 206—16.5 |
| 2,751,074 | 6/56 | Ringlen et al. | 206—56 |
| 2,915,175 | 12/59 | Diamant | 206—16.5 |
| 2,998,880 | 9/61 | Ladd | 206—63.2 |
| 3,092,252 | 6/63 | Brause et al. | 206—63.2 |

FRANKLIN T. GARRETT, *Primary Examiner.*